INVENTOR.
John A. Tauber
Harold A. Heiligman
BY
ATTORNEY

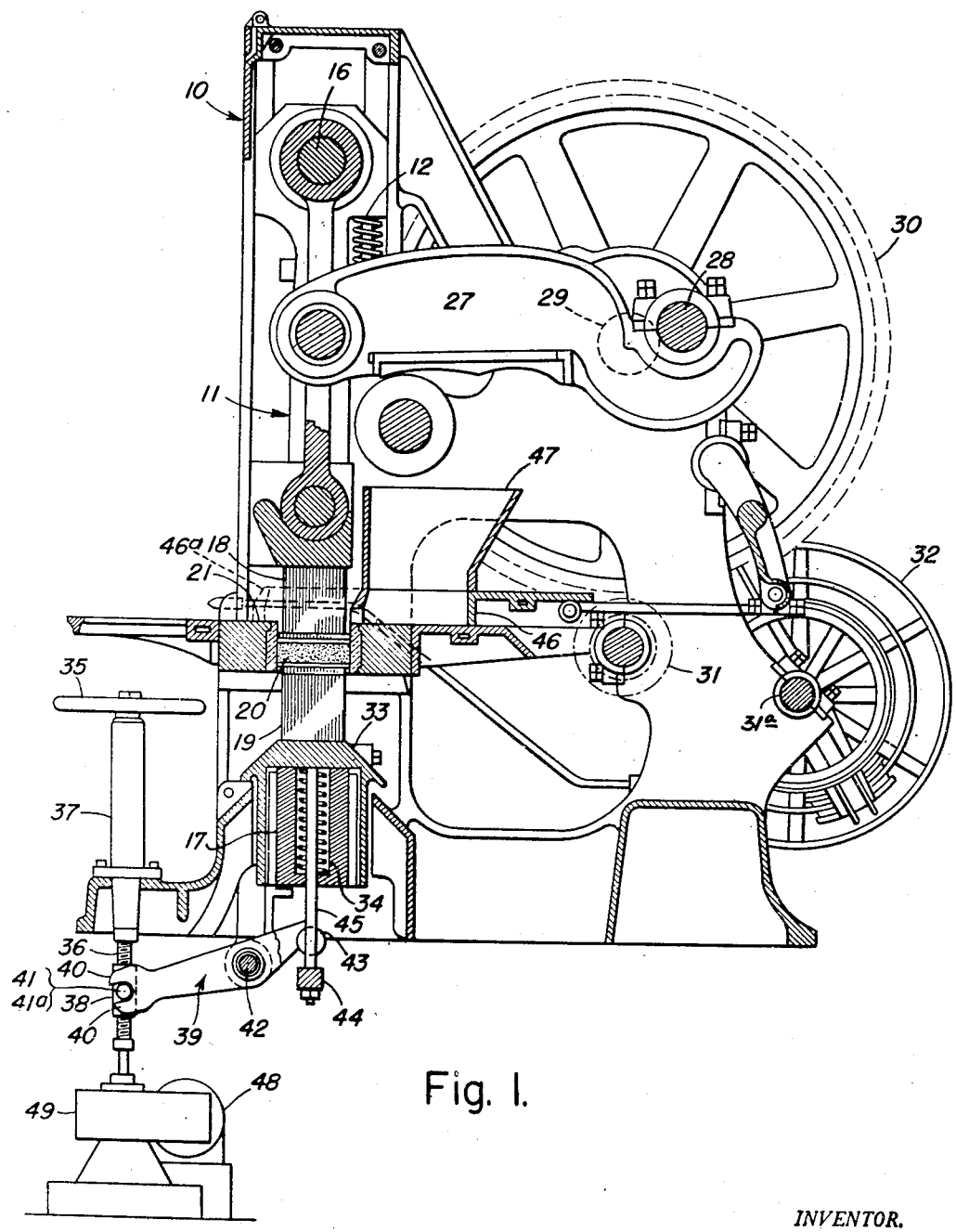
Fig. I.
INVENTOR.
John A. Tauber
Harold A. Heiligman
BY
ATTORNEY

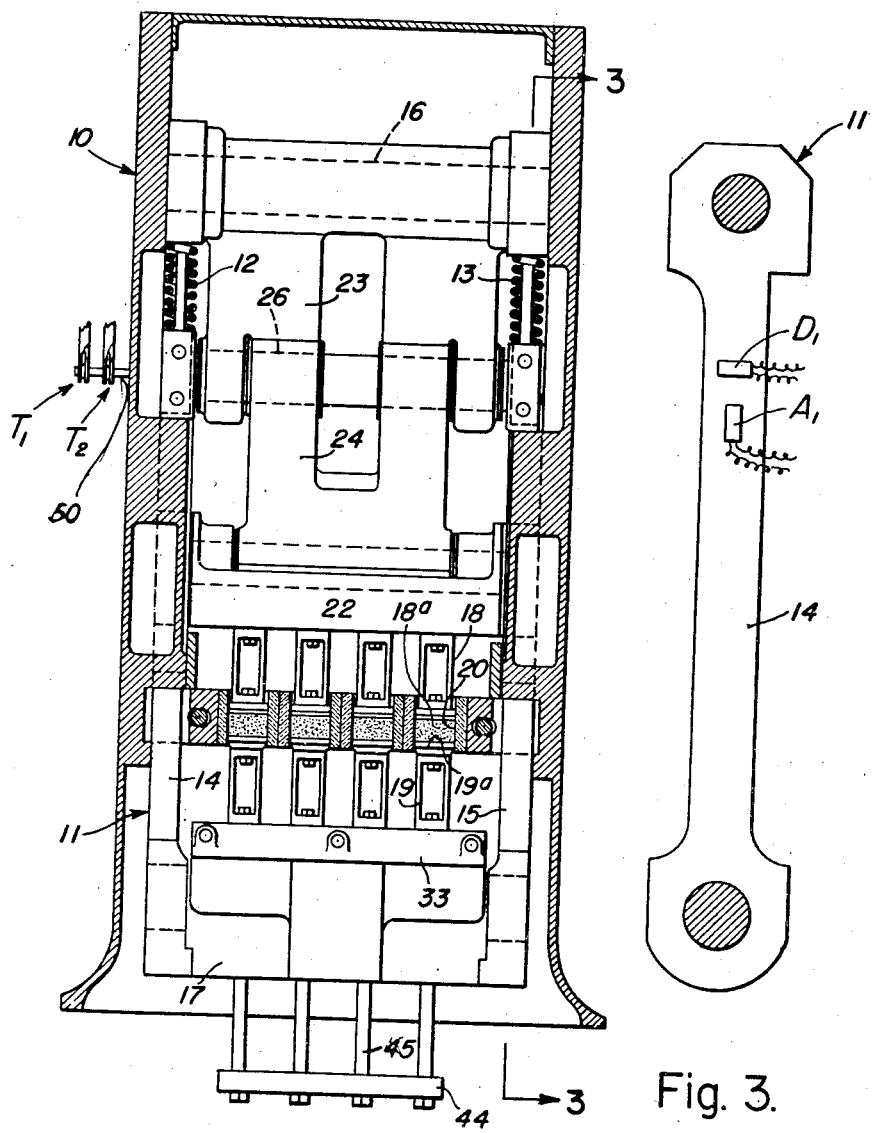

Dec. 7, 1948.  J. A. TAUBER ET AL  2,455,823
CONTROL APPARATUS FOR MOLDING PRESSES
Filed March 3, 1948  5 Sheets-Sheet 5

INVENTOR.
John A. Tauber
Harold A. Heiligman
BY
ATTORNEY

Patented Dec. 7, 1948

2,455,823

UNITED STATES PATENT OFFICE 2,455,823

CONTROL APPARATUS FOR MOLDING PRESSES

John A. Tauber and Harold A. Heiligman, Norristown, Pa., assignors to E. J. Lavino and Company, Philadelphia, Pa., a corporation of Delaware Application March 3, 1948, Serial No. 12,812

12 Claims. (Cl. 25—45)

This invention relates to a control or regulator apparatus, and method of using the same, for molding presses. More particularly it relates to apparatus or devices for controlling the volume of the material fed into the molds of a molding press such as a brick press during the feeding portion of the brick-forming cycle.

In a brick press, especially of the type known as the Boyd press, an example of which is shown in the patent to Flood No. 987,124, there is provided a mold with plungers to form the top and bottom of the mold. Means are provided for supplying material to the mold, and motor driven means are provided for moving the plungers toward each other for thus pressing the material in the mold into the shape of a brick. In a press of this general type, the position of the bottom plunger at the time the mold is filled determines the volume of the brick-forming mix which enters the mold, and therefore, determines the forming pressure, the weight of the brick, the thickness of the brick, and influences to a large degree the porosity and density of the brick.

The manufacturer of bricks, especially refractory bricks, strives for uniformity in the thickness, weight, and qualities of his product. The density and porosity of refractory bricks greatly influence several refractory qualities in which uniformity is an essential factor such as slag absorption, chemical reactivity to furnace slags and furnace atmospheres, and resistance to thermal shock. Uniformity of the bricks in the pressing operation is dependent upon three factors, the time of each pressing cycle being constant: (1) uniformity of the volume and the apparent density of the brick-forming mixture entering the mold during each cycle; (2) the same position of the bottom plunger relative to the top of the mold during each mold-filling operation; and (3) the application of the same amount of pressure during each cycle. Since the commonly used method of feeding the mold does not provide for absolute uniformity in the density of the brick-forming mixture entering the mold on each cycle, it is necessary that means be provided for making volume adjustments by controlling the position of the bottom plunger to compensate for variations in the density of the brick-forming mixture. In the normal press operation the adjustment is made manually from time to time, some times every few minutes, by the operator who judges from the weight and thickness of the brick whether the proper amount of material has been used, or from the sound of the press (as learned from his experience) whether excessive pressures are being used in brick-forming.

The adjustment of the volume of the mold to compensate for variations in the density of the brick-forming mixture also results in greater uniformity of the pressure exerted by the press on the brick-forming mixture from cycle to cycle.

The operator is then able to effect the adjustment by turning a handwheel either in the one or in the other direction whereby he either raises or lowers the normal position of the bottom plunger relative to the mold by degrees according to his empirical judgment. The handwheel turns a screw spindle having a suitable lost-motion operating connection with the bottom plunger of the mold.

Objects of this invention are to provide a control apparatus for molding presses to effect automatic variation of the volume of the material entering the mold in a manner to compensate for variations in the apparent density of the brick-forming material, and to effect adjustment of the weight of the material entering the mold of the press during the mold-filling portion of the cycle, in order to maintain substantially uniform pressure peaks from cycle to cycle by using the peak pressure of a preceding cycle to regulate the peak pressure reached in the succeeding cycle.

A known manner of making such adjustments is to make use of means for adjusting the initial or normal position of at least one of the plungers to vary the effective depth of the mold, which includes a reversible motor and means for automatically controlling the direction and extent of motion of the reversible motor.

Therefore, this invention may be said to constitute an improvement over the patent to Yeakel No. 2,256,798 in which automatic control of the brick-forming volume is governed by the electric peak power demand of the pressure during the brick-forming cycle. In this patent the peak power demand if excessively high starts a reversible motor which relatively raises the bottom plunger of the brick-form so as to decrease the effective mold volume. Correspondingly a peak power demand that is excessively low starts the reversible motor running in the opposite direction thereby effecting a relative lowering of the bottom plunger so as to increase the effective mold volume. In this way the volume of the brick-forming material is decreased or increased, as the case may be, in response to density variations of the material, although the mold volume during the brick-forming or pressing phase itself remains the same. Thus the dimensions of the bricks produced are uniform although density variations are being compensated for.

The present invention provides improved means for the automatic controlled variation of the brick-forming volume.

In order to attain the above objects this invention proposes to utilize the mechanical stress or elastic strain imposed upon certain parts of the press by the peak pressures of the brick-forming cycle as a criterion and to translate or convert that strain into an impulse for effecting corrective control of the volume of the brick-forming mixture being fed to the mold in each cycle.

This invention utilizes the peak pressure strain or stretch or elongation imposed upon those parts of the press structure which most directly absorb the peak pressure. Thus in the case of the aforementioned Boyd press this invention utilizes the strain or stretch imposed upon the side bars of the vertically movable frame herein also termed the sub-frame that carries the top and bottom plunger of the brick form or mold.

The strains are such as to result in elastic deformation or stretching of the respective structural parts in the sense that the stretch or elongation of the part or parts is directly proportional to the stress or load imposed upon them. This elongation is called elastic for the reason that it disappears when it is relieved of the load. Hence, a peak brick-forming pressure is characterized by a proportionate temporary or momentary peak elongation of the respective structural parts. Such elongations are extremely minute and are defined for various materials by their respective moduli of elasticity, that is the figure or factor that indicates how much a material under load will stretch within its limits of elasticity. For example, steel has a modulus of elasticity of 30,000,000 which means that a load of one pound imposed parallel to the length of a bar having a cross-sectional area of one square inch will produce a change in length of one thirty-millionth of an inch per inch of length of the bar.

In recent years such infinitesimally small elastic deformations or elongations, for example of steel or other materials have been rendered more conveniently measurable by means of electronic devices. In principle and in simplified form one such device comprises as an initial or primary element, the so-called strain gauge of which there are several types available but which will herein be exemplified by a resistance type strain gauge, that is a minute filament carrying an electric current and suitably attached or bonded to the part that will be subjected to the elastic elongation. In this way the strain gauge or resistance filament will be subjected to compression or elongation concurrently with the structural part under stress. The resistance of the strain gauge is thus altered in accordance with the degree of elastic structural deformation. This minute change of resistance in turn is registrable by suitable electronic tube devices which may translate or relay or amplify the impulse thus received into indications or relayed control actions. In principle, therefore, an electronic amplifier tube or electronic valve may serve this purpose.

We attain the objects of this invention by electronically relaying the mechanical strain or elastic elongation of the sub-frame caused by the peak brick-forming pressure, into automatic relay actions which effect corrective adjustments of the brick form volume or else of the brick-forming mixture fed to the form in each brick-forming cycle. That is to say, if an excessively high brick-forming peak pressure occurs it will set into motion a corrective or compensating action towards effecting an appropriate decrease in the effective volume of the brick mold. If an excessively low brick-forming peak pressure occurs, it will correspondingly produce an instantaneous impulse towards effecting an appropriate increase of the effective volume of the brick mold.

The Boyd press as such is well known and is a complicated and powerful machine, but since this invention relates to auxiliary or control equipment there will herein only be shown and described those parts of the press which are believed to suffice for a general understanding of its operation and to furnish the environment for the controls to be applied to the machine according to this invention.

Such a press comprises a main solid vertical machine frame in which a secondary frame or sub-frame is vertically guided and resiliently supported as by means of compression springs and is therefore herein also termed the floating sub-frame or floating frame. This sub-frame consists of vertical side bars rigidly interconnected by transverse top- and bottom end members. The sub-frame in effect carries the brick-pressing mechanism proper. This mechanism comprises an upper plunger unitary with a cross-head which is vertically guided in the sides of the sub-frame and vertically reciprocable through the action of a pair of toggle links or members suspended from the top end of the sub-frame and in turn actuated by the horizontally reciprocating motion of an eccentric driven pitman connected to the intermediate articulation point of the toggle links. Thus the upper plunger or cross-head will vertically reciprocate because of the horizontal reciprocation of the intermediate articulation point of the toggle links.

The pressing mechanism also comprises the bottom plunger which is unitary with the so-called saddle that is a member which is yieldingly mounted and supported upon the bottom end of the sub-frame and resiliently depressible thereon. Hence the bottom plunger is capable of downward movement against spring pressure from its normal position relative to the sub-frame. This upwardly spring-urged normal position of the bottom plunger may be subjected to adjustments, whereby a lowering or downward adjustment will cause a commensurate increment of spring compression, while a raising or upward adjustment will cause a commensurate degree of de-compression of the spring. Such are the adjustments to be effected automatically in response to peak pressures by the improved control devices of this invention.

Both the top and the bottom plunger cooperate with the vertical walls of the brick form or mold, as provided by a stationary mold table or loading platform which is rigidly unitary with the main stationary frame. That is to say, after the mold has been filled the top plunger enters the mold pressing the brick-forming mixture, the maximum or peak pressure being reached approximately at the bottom of the down-stroke of the top plunger and being maintained for a short period of time as the bottom plunger starts its upward stroke. Then both the top- and bottom plungers move upwardly maintaining approximately their relative positions until the bottom plunger reaches the top edge of the mold. The upward stroke of the bottom plunger terminates at the top edge of the mold while the top plunger continues its upward travel to a position which provides clearance for sliding or removing the finished brick onto the table or platform from the press, and to allow a charger or mold-feeding box to pass horizontally over the mold for re-charging the same. After the brick has been removed from the press, the bottom plunger returns to the position at the bottom of the mold, and the top plunger remains stationary as the charger refills the mold. The charger or feeding box then withdraws horizontally leveling the excess loose material even with the top of the mold or loading platform, whereupon the brick-forming cycle is repeated. The coaction or functional coordination of the top and bottom plungers with respect to each other and with respect to the mold charger is effected through the medium of suitable levers and toggle members motivated from the main press-operating motor. The bottom plunger is reciprocated in the proper rhythm by reciprocation of the sub-frame through such master-controlled means or mechanism. Such actuating means are well known in the Boyd press and are not particularly shown herein.

In the operation of the press the reciprocating charger has the dual function of feeding the mold and of delivering the brick onto the platform or table. The top- and bottom plunger disposed opposite one another fit the mold and act upon the material placed therein by the charger. In the course of a brick-pressing cycle both plungers compress the material in the mold, then the upper plunger withdraws upwardly while the bottom plunger advances to lift the resultant brick out of the mold and to the level of the mold table, whereupon the advancing charger delivers the brick onto the table and simultaneously refills the mold. After the charger has been withdrawn the brick-forming cycle starts anew. Thus, when the toggle members straighten out, bringing the top and bottom plungers toward each other, they exert pressure to compress the brick-forming mixture contained between them and confined by the vertical walls of the brick mold, and this pressure for its duration imposes an elastic stretch or elongation upon the side bars of the sub-frame. Measurement of the extent of this elongation, also termed strain, provides a measure of the absolute brick-forming pressure. This measurement, according to this invention, can be utilized as an impulse to operate a reversible auxiliary motor such as disclosed in the aforementioned Yeakel Patent No. 2,256,798 to effect the corrective control of the mold volume.

When the position of the bottom plunger during the mold-filling portion of the cycle is properly adjusted, that is to say when variations in the apparent density of the brick-forming mixture are compensated for by controlling the volume of the mold, the pressure values indicated by the side bar strain of the sub-frame are substantially uniform. Measurements of hundreds of bricks made under conditions in which the side bar strain was uniform show that under those conditions the bricks are more nearly uniform in thickness, weight, and density. By the present invention there is provided a control or regulator apparatus in which variations from a chosen value for the side bar strain automatically actuate means which increase or decrease the volume of the material fed to the mold to correct the condition which caused the variation.

Features of this invention reside in the electrical circuits effecting the control, and certain dispositions of the strain gauges within the electrical control system.

According to one feature strain gauges are so disposed within the electrical system that a variation of their resistance due to temperature changes is compensated for.

That is, each side bar of the sub-frame is provided with a pair of strain gauges, the one gauge being applied in the direction of load application strain and thus subject to elongation when the load is applied, the other being applied transversely to the direction of load application and thus being subject to compression when the load is applied. The compression experienced by the transversely applied gauge will be very much less than the elongation experienced by its companion gauge. Both pairs of strain gauges are connected into a Wheatstone bridge circuit in such a manner that the temperature factor is compensated for. When due to strain in the sub-frame the bridge system becomes unbalanced, the resulting bridge circuit is utilized through electronic relay action to start the reversible auxiliary motor in the sense of rotation that will produce the required adjustment of the bottom plunger.

According to another feature, control switch means are provided which are governed or timed by the operation of the press in such a manner that the electrical control system is placed under the controlling influence of the Wheatstone bridge only during that phase of the press cycle which substantially represents the duration of the peak pressure, that is the phase within which the corrective adjustment impulse is to be relayed due to unbalance of the system. During the remainder of the cycle the control system is kept in balanced or neutral condition due to its being connected to an auxiliary constant voltage source. That is to say, the control system is kept electrically alive or primed although balanced in neutral during the off- or rest period, that is the periods prior to and after the peak pressure appears.

According to a more specific feature, additional switch means are provided and governed by the operation of the press, and timed with respect to the first-mentioned switch means in such a manner that the operation of the auxiliary motor is effected during a period that lies well within the peak pressure period during which the Wheatstone bridge is connected to the control system proper.

Therefore, in terms of electrical control phases the cycle may be defined as comprising:

(a) an off- or rest period before and after the peak pressure occurs, during which the control system proper is kept in neutral balance due to its connection to an auxiliary constant voltage source, thus to condition the system for subsequent connection to the Wheatstone bridge.

(b) an alert period which within the cycle is complementary to the off-period, and during which the control system proper is placed under control of the Wheatstone bridge circuit for the pre-determined duration of the peak pressure phase, thus to condition the system preparatory to realizing the adjustment proper through the auxiliary motor; and (c) the active control period which falls well within the alert period, and therefore represents only a portion of that phase, during which the auxiliary motor is actuated to make the adjustment to the extent dictated by the bridge circuit.

Thus a required total adjustment of the bottom plunger may be made piece-meal during the active control period of a number of consecutive press cycles until the demand of the Wheatstone bridge is satisfied.

More specific features lie in the operation of the master switch means or timing switches which govern the above phases of the control cycle, and in the manner of their application to the press.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated one embodiment of the invention, but such embodiment is to be regarded as typical only of many possible embodiments, and the invention is not to be limited thereto.

The novel features considered characteristic of our invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a semi-diagrammatic sectional side view of a press of the Boyd type;

Fig. 2 is a semi-diagrammatic sectional front view of the press shown in Fig. 1, showing more clearly the vertical movable sub-frame within the stationary main machine frame, as well as the disposition upon the machine of the master control switches governing the adjustment of the feed volume of the brick-forming mixture for each brick-forming cycle;

Fig. 3 is a diagrammatic side view of the sub-frame showing the relative disposition of a pair of strain gauges relatives to each other and relative to the vertical direction of strain in the sub-frame;

Figure 4:
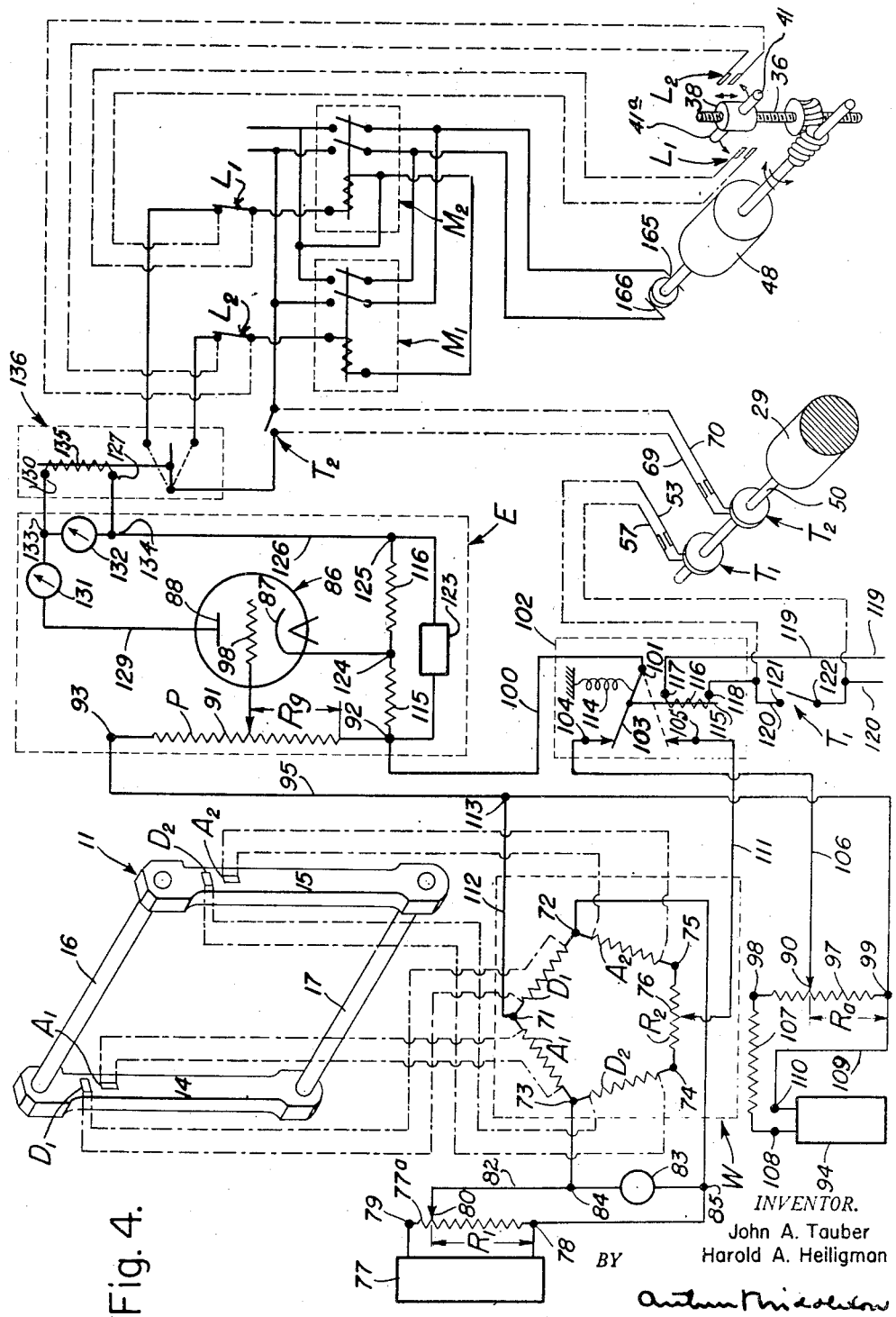
Fig. 4 is a wiring diagram of the electrical control system through which strain indications in the sub-frame are translated into corrective adjustments of the bottom plunger of the brick form, varying the feed volume of the brick-forming mixture in accordance with variations in the apparent density of the mixture.
Figure 4A:
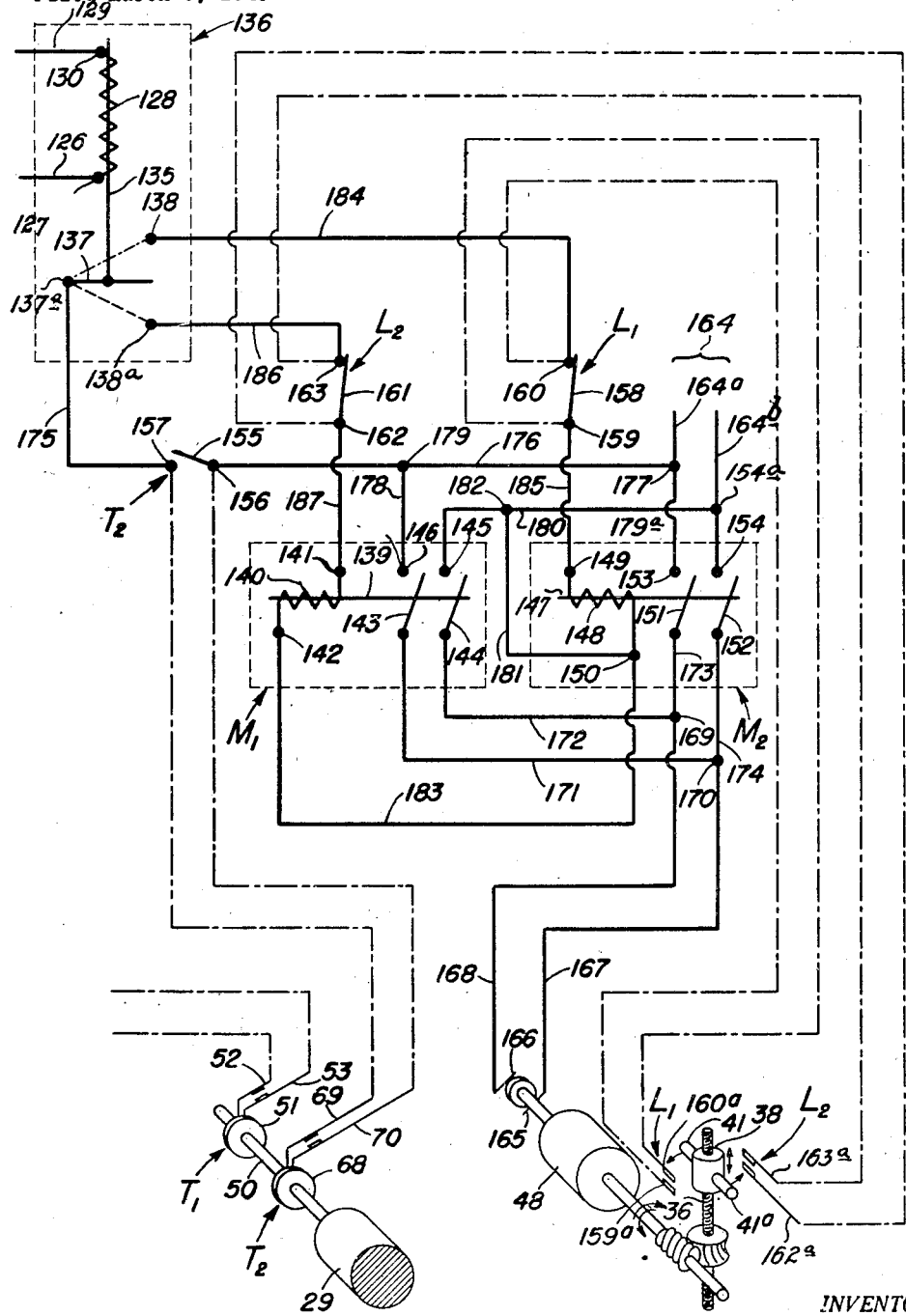
Figure 5:
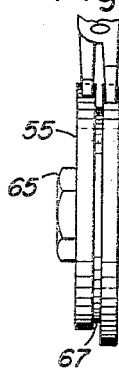
Figure 8:
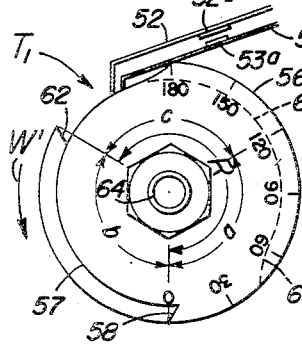
Figure 9:
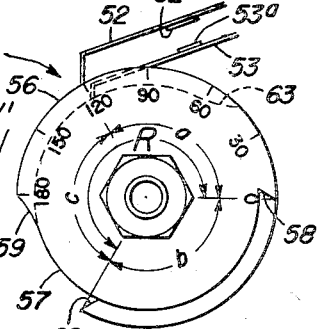
Figure 10:
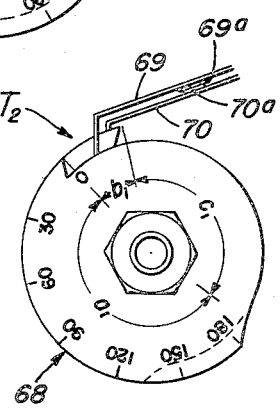
Figure 11:
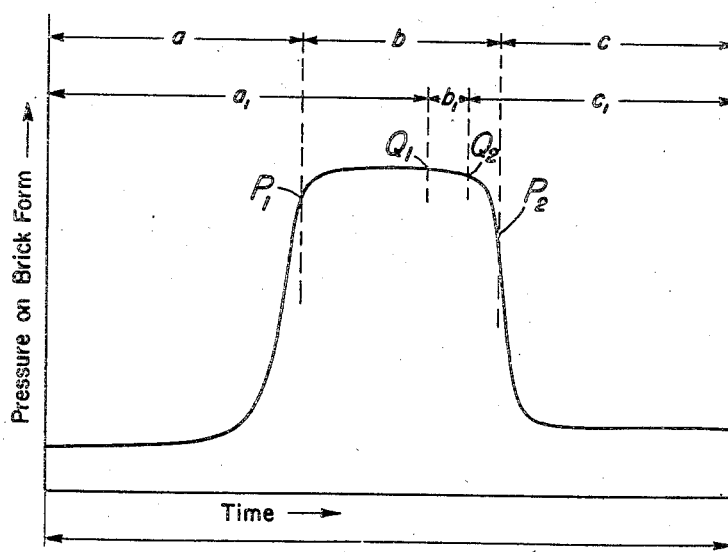

Fig. 4ª shows an enlarged end portion of the Fig. 4 wiring diagram;

Figs. 5 to 10 are detail views of the master control switches governed directly by the press, in various operational positions of the cycle;

Fig. 10ª is a sub-detail view somewhat reduced of a part of Figs. 5 to 10;

Fig. 11 is a chart of the brick-forming cycle in terms of brick-forming pressure as a function of time, indicating the timing of the master control switches with respect to the peak brick-forming pressure as well as with respect to each other.

A brick press of the Boyd type as shown in semi-diagrammatic fashion in Figs. 1 and 2 comprises a stationary machine frame 10 in which there is vertically slidable a sub-frame 11 horizontally supported upon the main frame as by springs 12 and 13 disposed one at each side of the sub-frame. The sub-frame consists of a pair of side bars 14 and 15 rigidly interconnected at the top by a transverse member or head-end or pivotal member 16, and at the bottom by a transverse member or foot-end portion or beam 17.

The sub-frame 11 in effect carries the entire brick-forming mechanism proper including a top plunger 18 and a bottom plunger 19 cooperating with the vertical walls of the stationary brick form proper 20 which is provided in a loading platform or work-table 21 rigidly carried by the machine frame. While this description speaks of a top plunger and a bottom plunger constituting the top and bottom respectively of the brick form, it will be understood that the Boyd type press employs a plurality of brick forms, and hence a plurality of top plungers with a corresponding plurality of bottom plungers, all forms working in parallel and simultaneously. For the sake of simplicity, the following description of the machine and its operation will refer substantially only to one brick form with one top and one bottom plunger.

Each plunger has fixed to its outer or brick engaging end a die or die plate that fits into the brick form, so the brick is compressed between the die plates while being confined by the vertical walls of the brick form surrounding them. Thus the top plunger 18 has a mold-engaging die 18ª, and the bottom plunger 19 has a mold-engaging die 19ª.

The upper die is rigidly attached or unitary with a cross-head 22 guided for vertical movement in the sub-frame 11, its up-and-down movement being controled by a pair of vertical toggle members or links 23 and 24, the upper toggle link 23 being swingable about the upper transverse member or pivotal member 16 of the sub-frame. Both toggle links 23 and 24 are interconnected by way of an articulation indicated by a pivotal member 25 to which is attached a pitman 27 reciprocated by an eccentric pivot or crank 28 provided on a crank shaft or main press shaft 29 which is rotated by customary drive means as indicated by a gear 30 fixed on the crank shaft 29. A pinion 31 mounted on shaft 31ª drives gear 30. A belt driven pulley 32 mounted on a shaft 32ª through suitable drive gearing (not visible in Fig. 1) drives shaft 31ª. These drive means being no part of this invention are described in the aforementioned patent to Flood No. 987,124.

Within a brick-forming cycle the top plunger 18 is in its lowest brick-forming position when the toggle links 23 and 24 are straightened or in vertical dead center position; whereas when the toggle links are in their farthest off-dead-center position, the top plunger will have reached its highest position clear of and raised a distance above the brick form. The present mechanism is such that the plungers perform a single brick-forming operation within a complete revolution of the crank shaft 29.

The bottom plunger 19 is mounted upon and fixed to what is herein termed a saddle 33 which is vertically movable and resiliently depressible upon and with respect to the lower transverse member or beam 17 of sub-frame 11. That is to say, the saddle 33 is urged upwardly from the bottom portion of the sub-frame by a compression spring 34 confined between the saddle 33 and the lower end of the sub-frame 11. The degree of initial compression of this spring 34 determines the initial brick-forming position of the bottom plunger 19 in the brick-forming cycle, that position, however, being adjustable by a handwheel 35 by means of which an operator can rotate a vertical screw spindle 36 mounted in a stand 37. Rotation in the one or in the other direction of the spindle 36 will raise or lower a nut 38 upon the lower end portion of the spindle. Thus nut 38 while capable of being raised or lowered relative to the stationary machine frame is held against rotation by its sliding or block-and-slide engagement with the double-armed lever 39 the forked ends 40 of which engage upon lugs 41 and 41ª provided upon the nut 38. That is, the lugs 41 and 41ª lodge in slots formed by and between forked ends 40. The lever 39 is fulcrumed at 42, its other end 43 having contact engagement with a cross-bar 44 to which are connected rods 45 extending upwardly and being concentric with and surrounded by the springs 34, the upper ends of these rods being connected with the saddle 33.

The lower plunger 19 is held in its initial brick-forming position by the lever 39 engaging the cross-bar 44, although in the further course of the brick-forming cycle the bar 44 disengages from the lever 39 as the bottom plunger 19 yields to the brick-forming pressure applied by the top plunger. Such manual adjusting means for the bottom plunger of the Boyd press is clearly shown in a perspective view in the aforementioned Yeakel Patent No. 2,256,798.

It will be understood in the course of the following description that the brick-forming cycle of the press is the result of the coaction of movements of plungers 18 and 19 relative to the sub-frame 11, and of the movements of the sub-frame 11 carrying the plungers relative to the machine frame.

During each brick-forming cycle the brick-forming material or mixture is fed or dispensed to the mold 20 in a known manner suitably controlled by the machine in correlation to the plunger movements by the mechanism embodied in the Boyd press but herein not specifically shown. Suffice it to say that a mold-feeder or charger or dispenser 46 receives its mold feed charge from a stationary feed hopper 47 and is reciprocated horizontally so as to slide upon the loading platform 21. In the course of such controlled reciprocation the charger 46 receives its charge from the feed hopper 47 above it while in its extreme retracted position, and drops its charge into the mold below it after having been slid out from under the hopper to its extreme advanced position above the mold. The charger 46 is dimensioned to carry to the mold a dispensed quantity of material somewhat larger than the mold volume requires, and on its retracting stroke returns the surplus material leaving the mold content level with the platform and ready to be compressed by the subsequently descending top plunger 18.

Hence, the brick-forming cycle of the Boyd press operates as follows:

Mechanism which is functionally associated with the press holds the bottom plunger 19 initially in a predetermined adjusted position whereby the plunger constitutes the bottom of the mold 20 and defines the volume thereof to be filled by the brick-forming material. This material being supplied from the feed hopper 47 is loaded or falls into the mold-feeding box or charger 46 which has a capacity greater than that required to fill the mold. The mechanism moves the charger 46 to the dotted line position 46ª over the mold, allowing its charge of material to discharge into the mold. The charger is then returned to its loading position under the hopper, and on this return movement levels the excess loose material even with the top edge of the mold. The press mechanism then straightens the toggle links 23 and 24 and thereby lowers the top plunger 18 allowing it to enter the mold so as to press the brick-forming mixture therein. In compressing the mixture on its downward stroke the top plunger also depresses the bottom plunger against the pressure of the saddle spring 34. Thus the maximum pressure is maintained at or about the lower dead-center position of the top plunger, and is also maintained for a short time as the bottom plunger 19 starts its upward stroke. As the top plunger continues upwardly, both plungers maintain approximately their relative positions with the compressed brick material between them, until the bottom plunger 19 reaches the top of the mold. That is to say, during the brick discharge phase of the cycle the press allows the lower plunger to rise past and above its initial mold-filling position until its top face is level with the face of the loading platform or top edge of the mold. Thus, the upward stroke of the bottom plunger 19 is stopped when the top face of the plunger is level with the face of the loading platform, while the top plunger 18 continues its upward travel to a position which provides clearance for the charger to slide or remove or displace the now exposed brick from the press as the charger passes again from its charge-receiving position under the hopper to its mold-filling position over the mold. This is to say, after the brick has been removed from the press the bottom plunger returns to its initial adjusted position at the bottom of the mold, and while the top plunger remains stationary in its raised position, the charger again proceeds on its outward stroke to fill the mold, then to be withdrawn, whereupon the brick-forming cycle is repeated.

With respect to the pressure conditions occurring during the brick-forming cycle, it should be understood that the pressure exerted upon the brick-forming mixture by the top plunger 18 on its downward stroke into the mold causes the bottom plunger 19 which is fastened to the saddle 33 to move until the saddle 33 touches the lower end or beam 17 of the sub-frame 11 compressing spring 34. The downward movement of the saddle 33 lowers the saddle rod 45 and its cross-bar 44 so that the cross-bar no longer maintains contact with the pressure- or mold volume-adjusting lever 39. The function of the mechanism is such that the pressing mechanism as far as it is mounted on the sub-frame 11 then rises bodily with the sub-frame 11 in relation to the stationary press frame 10 although the top plunger 18 is still moving downwardly toward the ascending bottom plunger 19 causing maximum compression of the brick-forming mixture when the top plunger 18 and the bottom plunger 19 are closest together. Mechanism for thus timing the vertical movement of the sub-frame 11 relative to the brick-forming movements of the plungers 18 and 19 is part of the mechanism of the Boyd press but not shown herein.

After a brick was pressed in this manner, if previously an operator of the machine wished to vary the volume of the brick-forming material passing into the mold for the next cycle he would turn the handwheel 35 to operate the pressure-adjusting screw spindle 36. Turning the handwheel in one direction would lower the nut 38 on the spindle which in turn would depress the outer end of lever 39 by means of the lugs 41 and 41ª engaging the lever. Thus the lowering of the nut 38 causes the inner end 43 of the lever to rise so that at the completion of the next downward stroke of the beam 17 or sub-frame 11 the position of the bottom plunger 19 will be raised since the contact of the inner end of lever 39 with the cross-bar 44 has been raised. This in turn permits the mold 20 to receive a smaller volume of the brick-forming material from the charger 46. Hence, the result of this adjustment is that diminished pressure will be exerted by the plunger upon the material being molded, thus producing a brick that has been less strongly compressed, or that has undergone a somewhat lower peak pressure in the brick-forming cycle than the brick that preceded it.

If, however, the operator turned the hand-wheel 35 in the opposite direction, a reverse sequence of events would take place, resulting in an increase of the volume of the brick-forming mixture or material entering the mold, and in a higher peak pressure in the brick-forming cycle.

To effect mold volume adjustments automatically, this invention utilizes an auxiliary reversible motor for rotating the adjusting screw spindle 36 either in the one or in the other direction as the demand may require. Such a motor is indicated at 48 and is adapted to drive the spindle 36 through reduction gearing indicated at 49. The disposition and use of such a motor in connection with the previously hand-operated spindle is shown in the aforementioned patent to Yeakel No. 2,256,798.

THE CONTROL SYSTEM

(a) The master control switches

There will now be described the automatic electrical control system proper of this invention whereby the auxiliary motor 48 is actuated to make the proper mold volume adjustments in response to peak brick pressure strains imposed upon the side bars 14 and 15 of sub-frame 11. This control system will therefore be described in relation to the pressure-time diagram (see Fig. 11) of the brick-forming cycle. The control system itself is represented in the wiring diagrams of Figs. 4 and 4ª and includes strain gauges $A_1$, $D_1$ and $A_2$, $D_2$ fastened to the subframe 11 (see Figs. 3 and 4) in a suitable manner to be unitary therewith, as well as master control or timing switches $T_1$ and $T_2$ actuated by the main or crank shaft 29 (see Figs. 2 and 4, as well as detailed Figs. 5 to 10). The strain gauges may be said to represent the primary control elements of the system and comprise a pair of strain gauges $A_1$ and $D_1$ fastened upon one side bar of sub-frame 11 and a similar pair of strain gauges $A_2$ and $D_2$ fastened upon the other side bar of sub-frame 11. It should be noted that the strain gauges $A_1$ and $A_2$ are vertically disposed, that is co-extensive with the direction of strain occurring in the side bars due to the brick-forming pressure so that these strain gauges will have their resistance increased in proportion to the strain or elastic elongation imposed upon the side bars of sub-frame 11 by the peak brick-forming pressure. The strain gauges $A_1$ and $A_2$ will therefore herein be called the pressure-responsive- or simply responsive strain gauges. By contrast the strain gauges $D_1$ and $D_2$ are horizontally disposed, that is transversely of the direction of strain occurring in the side bars so that their electrical resistance will remain largely unaffected by the strain in the side bars. The strain gauges $D_1$ and $D_2$ will therefore herein be called the non-responsive strain gauges. To some extent strain gauges are susceptible to temperature changes varying their resistance. Since the proper or fault-free operation of a control system according to this embodiment requires that the absolute values of the strain indications remain substantially unchanged, there are herein provided compensating means whereby indicating errors that might be due to temperature changes are cancelled out. This compensation for error is herein effected by a manner of associating the two responsive gauges with the two which are non-responsive, namely by associating them within a Wheatstone circuit W the arrangement and operation of which within the electrical control system will be described and explained further below. Each of the timing switches $T_1$ and $T_2$ comprises a rotary double track cam member of non-conductive material upon the periphery or cam face of which ride a pair of stationary contact fingers when the cam member is being rotated. That is to say, each cam member is associated with a pair of resiliently flexible contact fingers each of which rides upon one of the peripheral tracks or cam faces of the cam member and engages them under a suitable contact pressure the magnitude of which depends upon the degree of resilient deflection of the fingers. The two cam faces or tracks of each cam member are so shaped and so disposed with respect to each other that during the rotation of the cam member they will cause the associated pair of contact fingers to make or break contact between them. In fact each cam member comprises a pair of disc-like component members or discs held together face to face, each of which discs represents a respective track or cam face of the cam member. The two component disc members may be rotatably adjusted with respect to each other in order to adjust the timing of the opening and closing of the contact fingers.

The rotary cam members of both switches $T_1$ and $T_2$ are fixed coaxially upon a horizontal axial extension 50 of the main press shaft or crank shaft 29 (see Fig. 2) so that each revolution of the cam members corresponds to a concurrent brick-forming cycle of the press. Hence, the function of the switches $T_1$ and $T_2$ (shown in Fig. 2 as well as Figs. 5 to 10) will be more clearly understood when considered in its relationship to the pressure-time diagram of Fig. 11.

According to Figs. 5 to 9 the switch $T_1$ comprises a rotary cam member 51 associated with a pair of contact fingers 52 and 53 having contact points 52ª and 53ª respectively. This cam member 51 in turn comprises a pair of discs or track members 54 and 55 having peripheral cam faces or tracks engaged by the contact fingers 52 and 53 respectively.

Each of the component discs 54 and 55 per se has the identical peripheral shape of track or cam face although in the composite cam member the tracks in their co-operative relationship with respect to each other appear largely shifted or staggered so that they will operate their associated contact fingers in a manner further to be described below. The basic shape of a component disc is shown in Fig. 10ª. The peripheral track or disc 54 comprises a raised portion 56 and a complementary depressed portion 57, both portions totalling up to make the circumference. Between the raised and the depressed track portion of disc 54 there is an abrupt step or drop or overhang portion at 58 and a gentle or sloping transition at 59. The peripheral track on the component disc 55 comprises a raised portion 60 which is similar to the raised portion 56 on disc 54, and a depressed portion 61 which is similar to the depressed portion 57 on disc 54. Between the raised and the depressed track portion of disc 55 there is an abrupt step or drop or overhanging portion at 62, and a gentle or sloping transition at 63.

As the cam member 51 of switch $T_1$ rotates the contact fingers 52 and 53 will assume in the course of an operating cycle a sequence of positions relative to each other which sequence is represented in Figs. 6 to 9. In this way the movements of the contact fingers govern the operation of the electrical control system in timed relation to the brick-pressing cycle.

Figure 6:
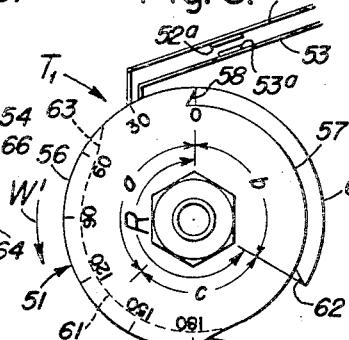

In Fig. 6 the contact between the fingers 52 and 53 is open due to the open contact points $52^a$ and $53^a$, since the tips of the fingers are in contact with identical track levels. The open condition of the contact fingers characterizes that period of rotation of the cam member 51 which is herein defined as the rest period R and which is represented by the sum total of the angles $a$ and $c$ in the rotation of the cam member. During this rest period R the open contacts between the fingers 52 and 53 keep the electrical control system disconnected and free from the influence of the strain gauges and thus un-influenced by any strain indications or reactions originating in the sub-frame 11. It will be noted that the angles of rotation $a$ and $c$ of this rest period correspond to the off-periods $a$ and $c$ indicated in the Fig. 11 pressure chart. Points $P_1$ and $P_2$ indicated upon the curve of the chart represent the end and the beginning respectively of the rest period, the period $b$ between points $P_1$ and $P_2$ representing the peak pressure face of the brick-forming cycle.

Figures 7, 10A:
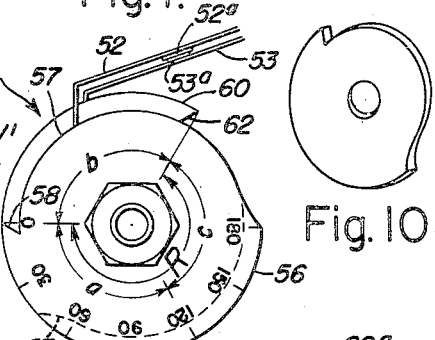

As the cam member 51 rotates counter-clockwise from the Fig. 6 to the Fig. 7 position in the direction of arrow W', the contact finger 52 because of the step or overhang 58 drops abruptly to the lower level of the depressed track portion 54, while finger 53 continues upon the raised track portion 60 thus closing the contacts $52^a$ and $53^a$ between the fingers. The point of closing of the contacts corresponds to point $P_1$ in the Fig. 11 chart. The contacts then continue closed while the cam member 51 rotates through an angle $b$ representing what is herein called the alert period of the present control cycle since it places the electrical control system under the influence of the strain gauges and thus conditions them with respect to strain indications or reactions from the sub-frame 11. The angle $b$ in Fig. 7 corresponds to the alert period or peak pressure period $b$ in the Fig. 11 chart.

As the cam member 51 continues rotating counter-clockwise, the contact fingers 52 and 53 pass from the Fig. 7 to the Fig. 8 position, that is from the alert period $b$ they again enter the rest period R. During this phase the finger 53 because of the step or overhang 62 of its track drops abruptly from its raised track portion 60 to its depressed track portion 61, thereby opening contacts $52^a$ and $53^a$ between the fingers, as both fingers are now again sliding on even track levels. The opening of the contacts $52^a$ and $53^a$ marks the end of the alert period $b$ and is identified as point $P_2$ in the Fig. 11 chart.

In Fig. 9 the cam member 51 has rotated further counter-clockwise and thus the contact fingers 52 and 53 are shown to have advanced well into or to about the middle of the rest period R, having passed through the angle $c$ and being about to continue through the angle $a$. While passing through the angle $c$ the finger 52 has mounted from it depressed track portion 57 up the sloping transition 59 and onto the raised track portion 56. This merely increases the spread or gap between the already open contacts of the fingers 52 and 53 and therefore does not otherwise alter the conditions of the rest period as such.

As soon as the cam member 51 continues rotating counter-clockwise the finger 53 also mounts onto its raised track portion 60 by way of the sloping transitional portion 63 of its track. This places both fingers again on the identical raised track level in the completion of the cycle.

It will be noted that the component discs or track members 54 and 55 of cam member 51 are mounted upon an outwardly threaded tubular member or sleeve member 64, and that they are pressed face to face towards each other by a pair of nuts 65 and 66 tightened upon the thread of the sleeve member 64, a suitable washer or spacer disc 67 being interposed between the discs 54 and 55. The thus assembled cam member 51 is mounted upon the axial horizontal extension 50 of the crank shaft 29 (see Fig. 2) to be rotatable therewith.

The operation of the switch $T_1$ controls and times the predetermined and pre-adjusted alert period $b$ within the press control cycle, during which period this switch establishes merely those connections which condition the electrical control system for response to the strain indications from the sub-frame, without as yet executing the actual mold volume adjustment. That is to say, the actual operation of the auxiliary motor 48 to effect the mold volume adjustment is governed by switch $T_2$ which comprises a composite cam member 68 rotating together with cam member 51 of switch $T_1$ and having an associated pair of stationary contact fingers 69 and 70, the cam member 68 and the fingers 69 and 70 as well as the mounting of the cam member 68 upon the shaft extension 50 being structurally similar to those of switch $T_1$.

The function of switch $T_2$ is to actuate the auxiliary motor 48 so as to effectuate mold volume adjustments in satisfying the demand originating from the strain gauges. That demand will be met by switch $T_2$ during what is herein called the active control period of the electrical control cycle indicated as $b_1$ in the Fig. 11 chart and as angle $b_1$ in the Fig. 10 showing of the cam member 68. From the Fig. 11 chart it will be seen that this active control period comprises only a selected and relatively small portion of the peak pressure phase or alert period $b$, this active control period thus lying well within the limits of the alert period $b$. Hence the switch $T_2$, herein also termed the active control switch, is open or inactive during off-periods $a_1$ and $c_1$ in the Fig. 11 chart, which periods are also designated as angles $a_1$ and $c_1$ on the cam member 68. The showing of active control switch $T_2$ in its Fig. 10 active position should suffice for the understanding of its function since the cyclic operation as such of that switch is in principle similar to cyclic operation of the alerting switch $T_1$. The difference between switches $T_1$ and $T_2$ does not lie in their individual constructions but in the difference of their timing adjustment, that is the timing adjustment of the component discs or track members with respect to each other in each cam member, and the timing adjustment of the cam members of both switches with respect to each other upon the shaft extension 50. The cam members 51 and 68 of both switches are provided with marginal or peripheral calibrations as a guide to their timing adjustment.

*(b) The electrical wiring system*

The Figs. 4 and $4^a$ wiring diagrams include the schematic perspective showing of those parts of the machine which are functionally directly associated with the operation of the electrical system. Such parts are the sub-frame 11, the main- or crank shaft 29 with its axial extension 50 carrying the cam members 51 and 66 of the respective master or timing switches $T_1$ and $T_2$, the contact fingers 52 and 53 of switch $T_1$, the contact fingers 69 and 70 of switch $T_2$, the auxiliary motor 46 driving the adjusting screw spindle 36 to raise or lower the nut 38 thereon. It will be remembered that this nut has a pair of lugs 41 and 41ª to actuate the adjusting lever 39, which lugs according to this wiring diagram are utilized to actuate limit switches $L_1$ and $L_2$ insuring stoppage of the auxiliary motor at upper and lower limits of travel of the nut 38.

The strain gauges $A_1$, $D_1$, $A_2$, $D_2$ as arranged in this wiring diagram represent the resistances or branches of a Wheatstone bridge W in which strain gauges $A_1$ and $D_1$ join at point 71, strain gauges $D_1$ and $A_2$ joining at 72, strain gauges $A_1$ and $D_2$ joining at point 73, and strain gauges $A_2$ and $D_2$ joining by way of a balancing resistance $R_2$ defined by connecting point 74 and 75 having a movable contact point 76. The bridge circuit proper to furnish the control impulse for the electrical system and eventually for the adjustment of the brick mold volume, is established across the points 71 and 76 of the Wheatstone bridge. An auxiliary current supply for the Wheatstone bridge is furnished by a constant voltage source 77 which is in circuit with a resistance 77ª defined by points 78 and 79 and having a slidable contact 80 for adjusting the voltage $R_1$ supplied to the Wheatstone bridge. A conductor 81 leads from point 78 of the voltage source to point 72 of the Wheatstone bridge; a conductor 82 leads from the slidable contact 80 to point 73 of the Wheatstone bridge. A volt meter 83 is connected across the conductors 81 and 82 at points 84 and 85.

The wiring diagram further comprises what is herein called an electronic potentiometer "E" indicated by the dotted line or box surrounding it. In order to illustrate the principle of its operation this electronic device per se is herein shown in its simplest form by way of example. The device "E" comprises an electronic amplifier tube sometimes also called an electronic valve, its principle being that it can control relay circuits through minute impulses or currents or variations of potential derived from a primary source. That is to say, the device E comprises an amplifier tube 86 the elements of which comprise a cathode 87, an anode 88, and a grid 89. During the off-period $a$ and $c$ the grid is under a potential derived through a slidable contact 90 adjustable upon a potentiometer resistance 97 defined as between points or terminals 98 and 99 and in circuit with a constant voltage source 94, for example a No. 6 dry-cell battery. That is to say, one conductor 95 leads from point 93 to a point or terminal 99 of a control or potentiometer resistance 97 as defined between points 98 and 99, while another conductor 100 leads from point 92 to point 101 of a relay switch 102 which has a movable switch member 103 and a pair of contact points 104 and 105 for the switch member; a conductor 106 extends from contact point 104 to the slidable contact 90 on resistance 97 which latter is connected through a resistance 107 to a terminal 108 of battery 94, point 99 being connected through a conductor 109 to the other terminal 110 of the battery.

The contact point 105 of relay switch 102 is connected through a conductor 111 to the slidable contact 76 of the Wheatstone bridge W. The switch 102 closes either upon contact 104 or upon contact 105, and does not normally occupy an intermediate or floating position. That is to say, the switch member 103 is normally closed by spring pressure upon contact 104 maintaining connection between points 92 and 93 of the electronic potentiometer E and points 98 and 99 of the voltage source 94. If, however, the switch member 103 is in the opposite dot-and-dash line position closing upon contact 105, it will thereby connect conductor 100 with the slidable contact 76 of the Wheatstone bridge through the conductor 111. A conductor 112 connects point 71 of the bridge with a point 113 upon conductor 95. Thus may be established the bridge circuit between points 71 and 76 of the Wheatstone bridge to furnish the control impulse to the electronic potentiometer E and through it the relay current through which the brick mold volume adjustment is realized.

The relay switch member 103 is normally urged by a spring 114 to close upon contact 104, but has an armature 115 surrounded by a solenoid coil 116 having terminals 117 and 118 supplied with operating current through conductors 119 and 120 leading to terminals 117 and 118 respectively and controlled by a switch herein called the timing switch $T_1$. The details have been described above in view of Figs. 5 to 9. Dot-and-dash lines leading from terminals 121 and 122 merely refer to the actual location of switch $T_1$ upon the extension 50 of crank shaft 29 of the press. The closing of the switch $T_1$ due to the closing upon each other of the normally open fingers 52 and 53 will therefore energize solenoid 116 and the magnetic pull upon armature 115 will overcome the tension of spring 114 and throw the switch member 103 to release contact 104 while closing upon contact 105.

Reverting now to that portion of the circuit system which is herein termed the electronic potentiometer E, a B-battery 123 supplies auxiliary circuit for the operation of the amplifier tube 86, the battery being in circuit with load resistances 115 and 116 defined by points or terminals 92, 124 and 125, the cathode 87 being connected to point 124 between the two load resistances. The auxiliary tube operating circuit herein also simply called the tube circuit is further defined by a conductor 126 leading to the one terminal 127 of a solenoid coil 128, and a conductor 129 leading from the anode 88 to the other terminal 130 of solenoid 128. An ammeter 131 is shown in conductor 129, a voltmeter 132 is shown between points 133 and 134 across the conductors 126 and 129.

The solenoid coil 128 surrounds an armature 135 which is part of a relay switch 136 which in distinction from the primary relay switch 102 may be called the secondary relay switch having a movable or swingable switch member 137 adapted to close either upon a contact 138 or upon a contact 139. Normally the system is electrically so balanced that the switch member 137 is maintained in an intermediate or floating position. However, a control impulse from the strain gauges on subframe 11 through the Wheatstone bridge W and through the electronic potentiometer E may cause the switch member 137 to be unbalanced or thrown in either the one or the other direction as the case may be, so as to close upon one of the contacts 138 and 138ª which eventually will start the reversible auxiliary motor 48 to rotate in either the one or the other direction to execute the brick mold adjustments called for by the impulses. Thus the secondary relay swtich 136 selectively closes a pair of normally open double-pole motor switch $M_1$ and $M_2$, switch $M_1$ to run the motor in the one direction and switch $M_2$ to run it in the opposite direction. Motor switch $M_1$ is represented by an armature 139 surrounded by a solenoid coil 140 and defined by its terminals 141 and 142. The armature 139 actuates switch members 143 and 144 to move in unison and adapted to close upon contacts 145 and 146. Motor switch $M_2$ is represented by an armature 147 surrounded by a solenoid coil 148 defined by its terminals 149 and 150, the armature 147 actuating switch members 151 and 152 to move in unison and adapted to close upon terminals 153 and 154.

However, the actual closing of the motor switches $M_1$ and $M_2$ is subject to the closing of the master or timing switch $T_2$ indicated in the diagram by its switch member 155 and with terminal 156 and a contact 157. The actual location of the switch $T_2$ is indicated by dot-and-dash lines leading to the contact fingers 69 and 70 engaging the rotary cam member 68 fixed on the extension 50 of crank shaft 29, the contact fingers 69 and 70 having contacts 69a and 70a adapted to close upon each other but are normally open.

The closing of the motor switches $M_1$ and $M_2$ also requires that the limit switches $L_1$ and $L_2$ be normally closed, limit switch $L_1$ being represented by its switch member 158 with terminal 159 and a contact 160, limit switch $L_2$ being represented by its switch member 161 with terminal 162 and a contact 163. The actual location of these limit switches is indicated for limit switch $L_1$ by dot-and-dash lines leading to a pair of contacts 159a and 160a, and for limit switch $L_2$ by dot-and-dash lines leading to a pair of contacts 162a and 163a. Thus the limit switches $L_1$ or $L_2$ may be opened by lugs 41 and 41a respectively depending upon whether the nut 38 is moved past its upper or lower limit position on the adjusting screw spindle 36 by the auxiliary motor 48.

The auxiliary motor 48 is supplied from a power source such as a 110 volt line indicated at 164 comprising the indicators 164a and 164b. The motor 48 indicated by its commutator brushes or contacts 165 and 166 has conductors 167 and 168 leading from these brushes to branch points 169 and 170 whence a pair of branch conductors 171 and 172 lead to switch members 143 and 144 of motor switch $M_1$, and a pair of branch conductors 173 and 174 lead to switch members 151 and 152 of motor switch $M_2$.

The relay switch member 137 is connected with the motor switches $M_1$ and $M_2$ by a conductor 175 leading from the switch member to terminal 157 of timing switch $T_2$, a conductor 176 leading from switch member 155 of timing switch $T_2$ to a point 177 on the 110 volt conductor 164a, a branch conductor 178 leading from a point 179 on conductor 176 to a contact 146 of motor switch $M_1$, and a branch conductor 179a leading from point 177 to contact 153 of motor switch $M_2$.

The 110 volt conductor 164b leads to contact 154 of motor switch $M_2$ and has a branch conductor 180 leading to contact 145 of motor switch $M_1$, a sub-branch conductor 181 leading from point 182 on branch 180 to terminal 150 of solenoid coil 148 of motor switch $M_2$. A conductor 183 leads from terminal 150 of solenoid coil 148 (of motor switch $M_2$) to terminal 142 of solenoid coil 140 (of motor switch $M_1$).

From contact 138 of relay switch 136 a conductor 184 leads to contact 160 of normally closed limit switch $L_1$, while a conductor 185 leads from terminal 159 of that limit switch to terminal 149 of solenoid coil 148 of motor switch $M_2$. From contact 138a of relay switch 136 a conductor 186 leads to contact 163 of normally closed limit switch $L_2$, while a conductor 187 leads to terminal 141 of solenoid 140 of motor switch $M_1$.

OPERATION OF THE ELECTRICAL SYSTEM

During the rest period R of the operating cycle, when the voltage $R_a$ from dry-cell battery 94 is properly adjusted, and the relay switch member 103 is normally closed upon contact 104 due to the pull of spring 114, there is established a conditioning circuit which will place the grid 89 of tube 86 under such a potential or bias as will permit B-battery current supplied by battery 123 to pass from cathode 87 to anode 88 and through the solenoid 128 of secondary relay switch 136. That is to say, a conditioning circuit is established from point 99, through conductor 95 to point 93, then through potentiometer resistance coil 91 to point 92, through conductor 100 to point or terminal 101 of the primary relay switch 102, through switch member 103 to contact point 104, and through conductor 106 to slidable contact 90. Thus the grid 89 and the cathode 87 are placed under a potential with respect to each other that will keep the secondary relay switch member balanced or floating in neutral position because of the tube circuit which includes the B-battery 123, points 92, 124 and 125, balancing resistances 115 and 116, cathode 87, anode 88, conductor 129, solenoid coil 128, and conductor 126.

In order to balance or adjust the system or the controlling potentials in such a manner as to obtain the desired action of the relay switch 136, one may proceed as follows:

First the grid potentiometer P or grid potential $R_g$ is so adjusted that the relay switch member 137 closes properly upon either the contact 138 or the contact 139, whichever the case may be, in response to impulses from the responsive strain gauges $A_1$ and $A_2$. The demand from these strain gauges causes an unbalance of the Wheatstone bridge W which reaches the relay circuit passing through electronic tube 86 in case the bridge circuit or potential is thrown onto the tube 86 by way of the primary relay switch member 103 closed upon the contact 105.

When the responsive strain gauges $A_1$ and $A_2$ are not subjected to deformations from any strains in sub-frame 11, that condition will leave the Wheatstone bridge circuit balanced, that is all four branches or resistances as represented by the strain gauges $A_1$, $D_1$, $A_2$, $D_2$, are in a desired balance, so that the bridge terminals 71 and 76 have a suitable and desired potential between them. This potential is such that when coupled with the tube circuit it will not affect the tube circuit and hence will not affect the secondary relay switch 136 unless disturbed or changed by peak brick-forming pressures which are either higher or lower than a desired intermediate value and which therefore unbalance the Wheatstone bridge by a corresponding change in the resistance value of the responsive strain gauges $A_1$ and $A_2$.

That is, when the resistance value of the strain gauges $A_1$ and $A_2$ is lower and that of the strain gauges $D_1$ and $D_2$ is higher than the desired intermediate value, it will cause the secondary relay switch member 137 to close upon one of its contacts, say contact 138ᵃ and thereby potentially energize solenoid 140 of motor switch M₁ to close the same, that is provided switch T₂ is closed. This starts the auxiliary motor 48 to run in the corresponding direction whereby it raises the nut 38 through rotation of the spindle 36 thereby lowering the outer end 43 of adjusting lever 39 engaging cross bar 44, and thereby ultimately effecting a downward adjustment of the bottom plunger 19 equivalent to a compensatory increase of the effective mold volume receiving the brick-forming mixture.

Correspondingly, when the resistance value of the responsive strain gauges A₁ and A₂ is higher and that of the strain gauges D₁ and D₂ is lower than the desired intermediate value, it will cause the secondary relay switch member 137 to close upon the other contact 138 and thereby potentially energize solenoid 148 of motor switch M₂ to close the same, that is provided switch T₂ is closed. This starts the auxiliary motor 48 to run in the opposite direction whereby it lowers the nut 38 through rotation of the spindle 36, thereby raising the outer end 43 of adjusting lever 39 engaging cross bar 44, and thereby ultimately effecting an upward adjustment of the bottom plunger 19 equivalent to a compensatory decrease of the effective mold volume receiving the brick-forming mixture.

Within the Wheatstone bridge W the responsive strain gauges A₁ and A₂ are in balance against the non-responsive strain gauges D₁ and D₂, but inasmuch as all four strain gauges are subjected to the identical temperature fluctuation and the attendant resistance changes, it will be seen that these resistance changes and any errors flowing from such changes with respect to strain gauge indications are cancelled out or compensated for by the very arrangement of the four strain gauges within the Wheatstone bridge. Hence the indications or impulses from the responsive strain gauges A₁ and A₂ will be transmitted through the Wheatstone bridge undistorted by whatever resistance changes the responsive strain gauges A₁ and A₂ per se may undergo because of temperature changes.

In the course of its brick-forming cycle the machine passes from the rest period R into the alerting period b as the crank shaft 29 rotates the cam member 51 of timing switch T₁ to close contacts 52ᵃ on 53ᵃ of contact fingers 52 and 53, thus energizing solenoid 116 of the primary relay switch 102 to throw switch member 103 against the pull of spring 114 into the dotted line position in which it closes upon contact 105. This couples the bridge circuit of the Wheatstone bridge W with the tube circuit, in that point 93 of the electronic potentiometer E is now connected to point 71 of the Wheatstone bridge by way of conductor 112, point 113, and conductor 95, and point 92 of the electronic potentiometer E connected to point 76 of the Wheatstone bridge by way of conductor 111, contact 105, switch member 103, terminal 101, and conductor 100. This condition maintains while the cam member of timing switch T₁ moves through the alerting period at the end of which solenoid 116 is de-energized due to the breaking of the contacts 52ᵃ and 53ᵃ of the contact fingers 52 and 53, which allows spring 114 to return the switch member 103 to its normal closing position upon contact 104.

Let it be assumed that during the alerting period b the demand from the strain gauges has caused the secondary relay switch member 137 to close upon contact 138ᵃ and to remain closed for the duration of that period. Within that period the rotation of crank shaft 29 and of cam member 68 reaches the point Q₁ of the pressure-time diagram (Fig. 11). This point marks the beginning of the active control period b₁ as cam member 68 closes the contacts 69ᵃ and 70ᵃ of contact fingers 69 and 70 thus closing the timing switch T₂ and effectuating the operation of auxiliary motor 48 by energizing the solenoid 140 of motor switch M₁. That is, from point 177 on the power line 164ᵃ a circuit is established through conductor 176, closed timing switch T₂, conductor 175, terminal 137ᵃ, switch member 137, contact 138ᵃ, conductor 186, through normally closed limit switch L₂, conductor 187, solenoid coil 140, conductor 183, point 150, conductor 181, point 182, and conductor 180 to a point on power line 164ᵇ. This closes the normally open motor switch M₁ to close a power feeding circuit to motor 48 from the power line 164ᵃ, through conductor 176, point 179, conductor 178, contact 146, switch member 143, conductor 171, point 170, conductor 167, and contact brush 165 through the motor armature, to contact brush 166, conductor 168, point 169, conductor 172, switch member 144, contact 145, and conductor 180 to a point on the power line 164ᵇ.

Alternatively it may be assumed that during the alerting period b the demand from the strain gauges has caused the secondary relay switch member 137 to close upon contact 138 and to remain closed for the duration of that period. Within that period, the rotation of crank-shaft 29 and of cam member 68 reaching point Q₁ of the pressure-time diagram (Fig. 11) enters the active control period b₁ as cam member 68 closes the timing switch T₂, energizing the solenoid coil 148 of motor switch M₂ and closing the same effectuating the operation of auxiliary motor 48 to run in a direction opposite to the direction that was previously assumed in response to the closing of motor switch M₁. That is, from point 177 on power line 164ᵃ a circuit is established through conductor 176, closed timing switch T₂, conductor 175, terminal 137ᵃ, switch member 137, contact 138, conductor 184, closed limit switch L₁, conductor 185, solenoid coil 148, point 150, conductor 181, point 182, and conductor 180 to a point on power line 164ᵇ. This circuit closes the normally open motor switch M₂ to close a power feed circuit to the auxiliary motor 48 from power line 164ᵃ, to contact point 153, closed switch member 151, conductor 173, point 169, conductor 168, contact brush 166, through the motor armature to contact brush 165, returning through conductor 167, point 170, conductor 174, and closed switch member 152 to a point 154ᵃ on the power line 164ᵇ.

When in the course of the operating cycle the rotation of crank-shaft 29 and hence of the cam member 68 reaches the point Q₂ of the pressure-time diagram (Fig. 11), the timing switch T₂ opens marking the end of the active control period b₁. That is, at that point the cam member 68 allows the contacts 69ᵃ and 70ᵃ on contact fingers 69 and 70 to open, thus de-energizing whichever of the motor switches M₁ or M₂ might have been operating to make a compensatory mold volume adjustment, and concluding the active control period b₁.

Shortly thereafter, as the rotation of crank-shaft 29 and hence of cam member 51 of timing switch T₁ reaches P₂ of the pressure-time diagram (Fig. 11), the timing switch T₂ also opens de-energizing solenoid coil 116 of the primary relay switch 102, allowing spring 114 to return the switch member 103 to its closing position upon contact 104, thus restoring the electrical system to the balanced condition of the rest period R which influences the solenoid coil 128 in such a manner as to allow the secondary relay switch member 137 to release whichever of the contacts 138 and 139 it may have held engaged, and to return to its neutral or balanced or floating position which in turn is the result of the timing of the circuit derived from the auxiliary constant voltage source or No. 6 dry-cell battery 94, and initially described in the operation of this cycle.

If for any reason the corrective upward or downward movements of the adjusting nut 38 exceed a predetermined upper or lower limit, the lugs 41 or 41ᵃ will open limit switch L₁ or L₂ respectively so as to open motor switch M₂ or M₁ respectively, thus stopping any further movement of the nut 38.

As for the function of the electronic potentiometer E it will be understood that, if the bridge output or potential at points 71 and 76 of the Wheatstone bridge increases because of excessive brick-forming or peak pressure due to an increase in the apparent density of the feed mixture, and a corresponding reaction of the strain gauges, the grid 98 becomes more negative thus permitting less B-battery current to pass through the amplifier tube 86. This in turn causes the solenoid 128 of the secondary relay switch 136 to be less energized, thus releasing the armature 135 to the extent that it closes the switch member 137 upon contact 138ᵃ thereby conditioning motor switch M₁. That is, the motor circuit is thus conditioned to start the motor 48 to run in the corresponding direction upon closing of the timing switch T₂, to effect the required compensatory mold volume adjustment whereby the bottom plunger 19 is adjusted upwardly.

Similarly, if the brick-forming or peak-pressure is reduced below the desired value due to a decrease in the apparent density of the feed mixture and a corresponding reaction of the strain gauges, thus changing the bridge output or potential at points 71 and 76 of the Wheatstone bridge, that change of potential impressed upon the grid 98 will render the grid less negative and therefore permit more B-supply current to pass through tube 86. This increased current energizes the solenoid 129 of secondary relay switch 136 to the extent that it will pick up the armature 136 causing the switch member 137 to close upon contact 138 thus conditioning motor switch M₂. That is the motor circuit is thus conditioned to start the motor 48 to run in the opposite direction upon closing of the timing switch T₂, to effect the required compensatory mold volume adjustment whereby the bottom plunger 19 is adjusted downwardly.

In either case, whether the demand be for upward or for downward adjustment of the bottom plunger 19, the control operation may continue by increments through a sequence of brick-forming cycles until the full total of required bottom plunger adjustment is reached, that is until the demand from the strain gauges is satisfied.

After the full measure of the required adjustment has been reached, then in the subsequent brick-forming cycles the switch member 137 will remain in its floating or neutral position. That is even though the master- or timing switches T₁ and T₂ will function in each cycle in the manner described above, there will be no control response as the control switches M₁ and M₂ will not be affected and will not respond.

With a knowledge of circuit constants, the actual voltage indicated by 132 (or current indicated by 131) may be calculated for any given strain measured by the gauges. Through a knowledge of mechanics and the design of the press this strain can be converted to specific pressure units. Thus voltmeter 132 or ammeter 131 can be provided with an auxiliary scale from which the actual pressing pressure may be read directly. By varying R₁ the sensitivity of the bridge circuit W may be varied so that this scale will always be correct, no matter what pressing area is being used.

Adjustment for operation of the electrical system involving the dry cell 94, constant voltage source 77, strain-gauge bridge circuit W, and electronic potentiometer E, may be effected as follows:

a. With potentiometer resistance 91 in the circuit adjust 77ᵃ to provide a voltage, indicated by 83, which will cause 132 to read directly in pounds per square inch for whatever total pressing area is being used.

b. With no load on the press, and with switch member 103 contacting 104, adjust sliding contact 90 until it coincides with point 99, i. e. a voltage of zero will then be applied to the tube circuit. Then adjust R₈ until 132 indicates zero pounds per square inch pressing pressure.

c. With the press loaded exactly to the desired control point, and with switch member 103 contacting 105, adjust R₂ until switch 136 is in the neutral position.

d. With switch member 103 contacting 104, adjust sliding contact 90 until switch member 137 is again in the neutral position.

The use of the two pairs of strain gauges, their mounting on the sub-frame of the machine and the manner of their operation as shown in the present embodiment has certain advantages under certain conditions. That is, with a responsive strain gauge mounted on each arm, the pressure average taken across the several mold boxes is obtained. Furthermore, by mounting the non-responsive strain gauges as close as possible to the responsive strain gauges and by connecting them into the bridge circuit W in the manner shown, all gauges are subjected to identical temperature conditions or fluctuations so that errors due to temperature influence from that angle are cancelled out.

Other modes of using and mounting strain gauges are possible within the scope of this invention. For example, the non-responsive strain gauges may be mounted separately from the responsive strain gauges and separately from the sub-frame 11, as long as the temperature conditions to which they are subjected are the same as those which the responsive strain gauges must encounter.

Also, the control could be made to operate with only a single responsive strain gauge mounted on the press.

As to the scope of the concept of this invention, it will be understood that the circuit controlled by the primary relay switch 102 to establish the rest period "$a+c$" which circuit may also be termed the holding circuit, is a refinement upon a more basic concept, the more basic concept being directed to the actual adjustments or control phases $b$ and/or $b_1$ proper.

No undue limitation should be imposed upon the scope of this invention in view of the Wheatstone bridge circuit disclosed in the present embodiment. That is to say, other than the specific Wheatstone bridge circuit may be employed. Thus the bridge circuit may be described more broadly as a basically four-branch potential balancing bridge circuit in which at least one branch includes a responsive strain gauge.

Still another consideration regarding the scope of this invention is that not only resistances, but also reactances, or capacitances may constitute branches of the potential-balancing circuit which by way of example only is herein presented as a Wheatstone bridge that is based on the use of resistance type branches. For example also, electronic tubes may be embodied in or may represent one or more branches of such a balancing circuit. Accordingly also, other than resistance type strain gauges, for example capacitance or reactance type strain gauges may be employed within the scope of this invention and depending upon conditions alternating current may be employed instead of direct current auxiliary current sources shown in the present embodiment.

What we claim is:

1. The combination with a cyclically operating power-driven brick-press having a stationary main frame, a brick mold stationary with said frame, a vertical sub-frame vertically movable upon and with respect to the stationary main frame in a manner controlled by a brick-forming cycle which sub-frame is adapted to absorb directly the brick-forming peak pressure, a top plunger and a bottom plunger for the mold and carried by said sub-frame, mechanisms for actuating the plungers with respect to each other and with respect to the mold to effect a brick-forming and -ejecting cycle, controllable adjusting means having a rotatable adjusting element for upwardly or downwardly adjusting the initial position of the bottom plunger determining the effective mold volume receiving the brick-forming mixture, and a reversible motor for driving said rotatable adjusting element; of a control system for automatically effecting an upward adjustment of the bottom plunger responsive to an increase in the apparent density of the brick-forming mixture and for effecting a downward adjustment of the bottom plunger responsive to a decrease in the apparent density of the mixture which system comprises a pair of responsive strain gauges mounted upon the peak pressure-absorbing portion of the sub-frame, a pair of non-responsive strain gauges subjected to substantially the same temperature conditions as the responsive strain gauges, a four-branch potential-balancing circuit with adjustable constant voltage supply to furnish input potential for the circuit, both said pairs of strain gauges constituting respective pairs of branch resistances of the circuit, the pair of responsive strain gauges being adapted to alter the bridge output potential when subjected to strain while temperature influences upon the strain gauges cancel out because of the balance condition between the responsive and the non-responsive strain gauges within the circuit, an auxiliary electronic circuit variable in response to variations of the bridge output potential, means for impressing said bridge output potential upon said electronic circuit, motor relay means controlled by said electronic circuit and adapted to close a motor-operating circuit to run the motor in one direction responsive to a drop of the bridge potential below a given intermediate value and to run the motor in the opposite direction responsive to a rise of the bridge output potential above a given intermediate value, and means for limiting the adjustment of the plunger within a press cycle.

2. A control system according to claim 1, in which said balancing circuit is of the Wheatstone bridge type.

3. A control system according to claim 1, with the addition of an auxiliary adjustable constant voltage supply, primary relay means operable by a primary power source to selectively impress upon said electronic circuit either the potential of said auxiliary voltage or the potential of the bridge output, and timing means controlled by the press cycle to thus selectively actuate the relay means in synchronism with a press cycle to impress said bridge output potential during a peak pressure portion of the cycle.

4. A control system according to claim 1, with the addition of an auxiliary adjustable constant voltage supply, primary relay means operable by a primary power source for selectively impressing upon said electronic circuit either the potential of the auxiliary voltage during an alerting period of a press cycle or the bridge output potential during a rest period of the press cycle, a timing switch controlling said primary power source for thus selectively actuating said relay means, and timing means controlled by the press cycle to actuate said timing switch in synchronism with a press cycle whereby said alerting period comprises a peak pressure portion of the cycle.

5. A control system according to claim 1, with the addition of a timing switch controlling said motor operating circuit, and timing means controlled by the press cycle for actuating said switch to run said motor during an active control period comprising a peak pressure portion of a press cycle.

6. A control system according to claim 1, with the addition of an auxiliary adjustable constant voltage supply, primary relay means operable by a primary electric power source for selectively impressing upon the electronic circuit either the potential of said auxiliary voltage supply during a rest period or the bridge output potential during an alerting period, a first timing-switch controlling said primary power source for thus selectively actuating said relay means, a second timing switch controlling said motor-operating circuit to run the motor during an active control period, and timing means controlled by the press cycle for actuating said timing switches in synchronism with said press cycle so that the alerting period comprises a peak pressure portion of the cycle and the active control period comprises a smaller peak pressure portion within the first mentioned peak pressure portion.

7. A control system according to claim 1, in which the press-actuating means comprise a stationary crank-shaft one rotation of which moves the top plunger through a full reciprocation, with the addition of an auxiliary adjustable constant voltage supply, primary relay means operable by a primary electric power source and selectively operable thereby to impress upon said electronic circuit either the potential of said auxiliary voltage supply during an alerting period or the bridge output potential during a rest period, a first timing switch controlling said primary power source for thus selectively actuating said relay means, a second timing-switch controlling said motor-operating circuit to run the motor during an active control period, and timing means effective between said crank shaft and said timing switches for actuating said timing switches in synchronism with a press cycle so that said alerting period comprises a peak pressure portion of the cycle and said active control period comprises a peak pressure portion within said first-mentioned peak pressure portion.

8. A control system according to claim 1, in which one responsive strain gauge is disposed on each side of the sub-frame.

9. A control system according to claim 1, in which one responsive as well as one non-responsive strain gauge is disposed on each side of the sub-frame.

10. A control system according to claim 1, in which the non-responsive strain gauges are mounted upon the sub-frame.

11. A control system according to claim 1, with the addition of an auxiliary adjustable constant voltage supply, primary relay means operable by a primary electric power source for selectively impressing upon the electronic circuit either the potential of said auxiliary voltage supply during a rest period or the bridge output potential during an alerting period, a first timing switch controlling said primary power source for thus selectively actuating said relay means, a second timing switch controlling said motor-operating circuit to run the motor during an active control period, timing means controlled by the press cycle for actuating said timing switches in synchronism with said press cycle so that the alerting period comprises a peak pressure portion of the cycle and the active control period comprises a smaller peak pressure portion within the first-mentioned peak pressure portion, in which system one of said switches comprises a rotatable switch member having a pair of component cam members rotatable as a unit each provided with a peripheral track having a relatively raised and a relatively recessed peripheral portion, means for angularly adjusting said component cam members with respect to each other whereby the track portions of said component cam members are staggered relative to one another, a pair of contact fingers each of which engages a respective track, the angular adjustment of the tracks relative to each other being such as to open and to close the contact fingers with respect to each other at predetermined points of rotation of said switch member.

12. A control system according to claim 1, with the addition of an auxiliary adjustable constant voltage supply, primary relay means operable by a primary electric power source for selectively impressing upon the electronic circuit either the potential of said auxiliary voltage supply during a rest period or the bridge output potential during an alerting period, a first timing switch controlling said primary power source for thus selectively actuating said relay means, a second timing switch controlling said motor-operating circuit to run the motor during an active control period, timing means controlled by the press cycle for actuating said timing switches in synchronism with said press cycle so that the alerting period comprises a peak pressure portion of the cycle and the active control period comprises a smaller peak pressure portion within the first-mentioned peak pressure portion, in which system one of said switches comprises a rotatable switch member having a pair of component cam members rotatable as a unit each provided with a peripheral track having a relatively raised and a relatively recessed peripheral portion, means for angularly adjusting said component members with respect to each other whereby the track portions of said component cam members are staggered relative to one another, and a pair of contact fingers each of which engages a respective track, the angular adjustment of the tracks relative to each other being such as to open and to close the contact fingers with respect to each other at predetermined points of rotation of said switch member, with the addition that the peripheral tracks of said component cam members per se are substantially identical.

JOHN A. TAUBER.
HAROLD A. HEILIGMAN.

REFERENCES CITED

The following references are of record in the file of this patent:

UNITED STATES PATENTS

| Number | Name | Date |
|---|---|---|
| 2,256,798 | Yeakel | Sept. 23, 1941 |
| 2,293,815 | Gates | Aug. 25, 1942 |